Nov. 6, 1962
R. S. WEBB
3,062,192
ELECTRO-HYDRAULIC SERVO SYSTEM
Filed Feb. 11, 1960
2 Sheets-Sheet 1
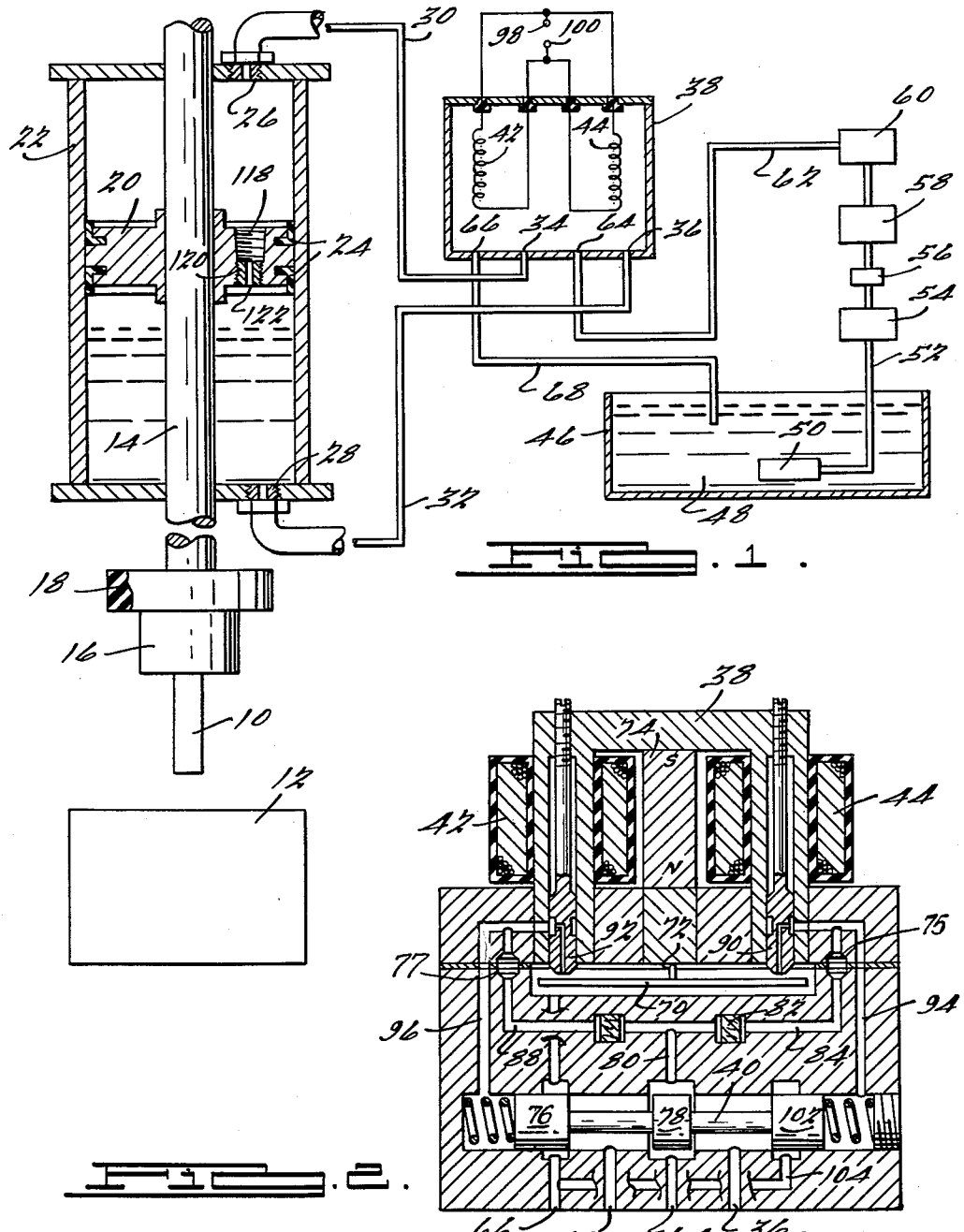
INVENTOR.
Robert S. Webb.
BY
M K Murphy
ATTORNEY.

Nov. 6, 1962 R. S. WEBB 3,062,192
ELECTRO-HYDRAULIC SERVO SYSTEM
Filed Feb. 11, 1960 2 Sheets-Sheet 2
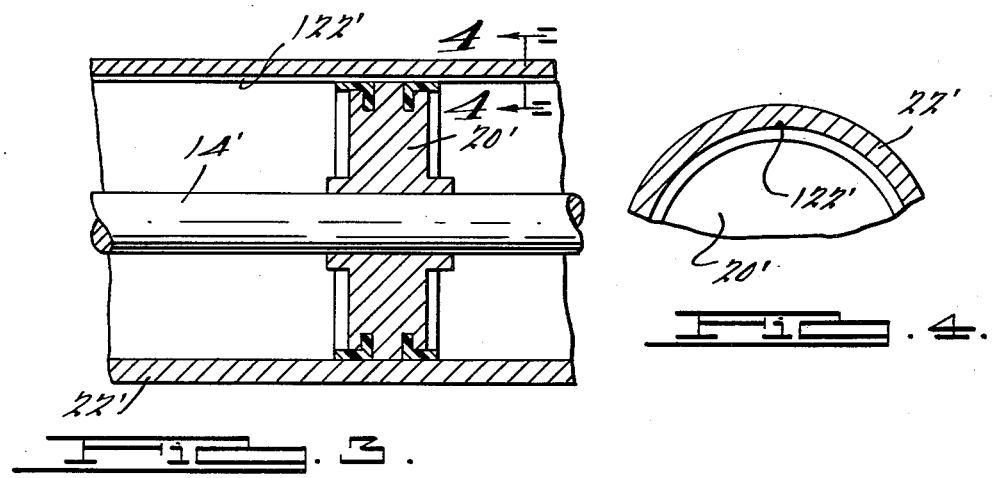
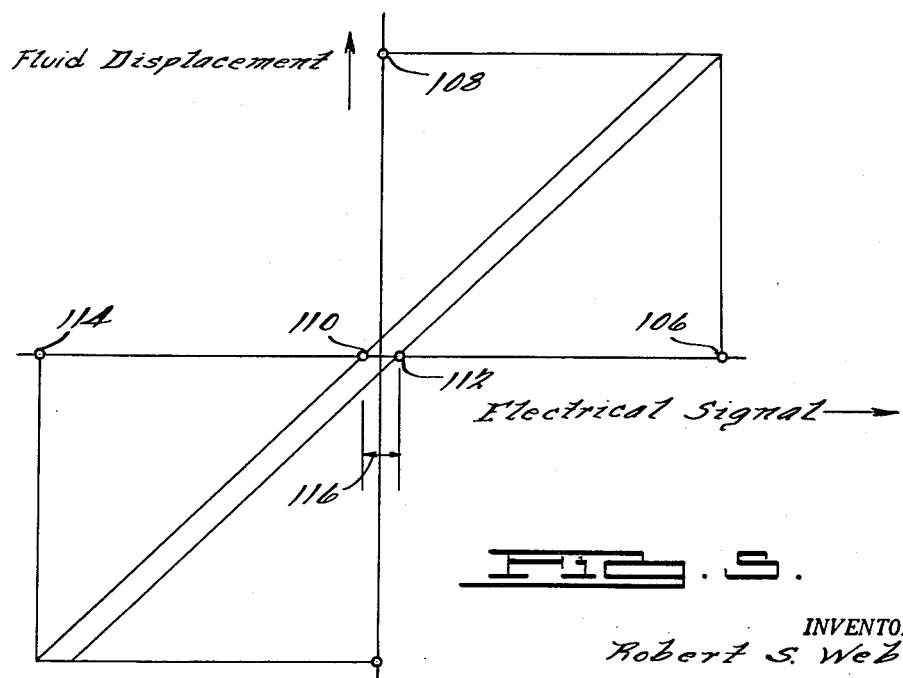
INVENTOR.
Robert S. Webb
BY
M K Murphy
ATTORNEY

United States Patent Office 3,062,192
Patented Nov. 6, 1962

3,062,192
ELECTRO-HYDRAULIC SERVO SYSTEM
Robert S. Webb, Bloomfield Hills, Mich., assignor to Elox Corporation of Michigan, Troy, Mich., a corporation of Michigan
Filed Feb. 11, 1960, Ser. No. 8,129
15 Claims. (Cl. 121—38)

This invention relates to improved servo feed means particularly for use in connection with hydraulically actuated servo feed systems in electrical discharge machining and electrochemical machining, although the invention is not limited to such use.

Recent developments in the electro-erosion machining field have led to the use of large electrodes which are bulky and heavy. The automatic servo-feed systems generally used for positioning and feeding the electrodes have been increased in size and capacity in order to handle these heavy electrodes, and in many instances hydraulic cylinders have been substituted for the motor and gearing used initially. Reference is made to McKechnie Patent No. 2,882,437, by way of example.

These hydraulically actuated servo-feed systems have certain advantages over the electro-mechanical type, and have important disadvantages which this invention overcomes.

For example, gas (mostly air) becomes entrapped in the fluid circulating circuit and, unless eliminated, becomes the equivalent of mechanical backlash with consequent mushiness of operation and impairment of sensitivity of operation. My improvement provides continuous and automatic elimination of gas from the circulating system and thus eliminates backlash.

Another factor which is detrimental to the operation of these fluid servo systems is the lack of threshold sensitivity from a condition of null or zero movement.

It is well known in the electrical machining art that the servo system must be capable of very fast feed rate for proper electrode retraction and recovery under short circuit conditions and for rapid electrode advance under open circuit conditions. However, during normal machining the rate of advance of the electrode is extremely slow—in most instances, less than one percent of maximum. For example, a typical hydraulic power feed currently in use in electrical-discharge-machining apparatus has a maximum or open circuit feed rate of approximately 30 inches per minute. The approximate maximum feed rate during actual machining is .030 inch per minute and frequently falls to .000001 inch per minute in precise finishing operations. It may be seen therefore that the servo system is operating at a point very close to the null or zero point most of the time.

The prime object of my invention is to overcome operating deficiencies in such hydraulically actuated servo-feed systems, and to improve the operation and sensitivity of such systems.

Another object is to eliminate difficulties in the operation of such systems caused by valve hysteresis and lack of good threshold sensitivity as will appear from the following discussion.

In the accompanying drawings:

FIG. 1 is a schematic view of a hydraulic servo feed system constructed in accordance with my invention, the cylinder being shown in vertical section;

FIG. 2 is a detail sectional view, on an enlarged scale, of the control valve of FIG. 1;

FIG. 3 is a fragmentary sectional view of a horizontally disposed cylinder for use in the FIG. 1 system;

FIG. 4 is a section taken on line 4—4 of FIG. 3;

FIG. 5 is a graphical representation of the hysteresis or threshold sensitivity characteristic of the servo system.

Referring now to the figures and to FIGS. 1 and 2 in particular, it will be seen that I have shown a power feed for an electrode 10 which is intended to be fed toward a workpiece 12 for machining the same by intermittent electrical discharge. The electrode 10 is secured to a piston rod 14 by a suitable collet 16 which is electrically insulated from the rod by an insulating member 18. The rod 14 is carried by a power feed piston 20 slidably disposed in a cylinder 22. The piston is provided with suitable seals 24 of Teflon or other suitable material.

Fluid inlet-outlet ports 26, 28, are disposed in the respective cylinder heads, these ports being connected by conduits 30, 32, with ports 34, 36, of an electrohydraulic servo control valve 38. The latter has a spool 40 (FIG. 2) which is controlled by a pair of electromagnetic coils 42, 44, as will be explained.

The fluid circuit comprises a reservoir 46 which contains fluid 48. The fluid is drawn through screen 50 and suction line 52 by a pump 54. The pump, which typically operates in a range of 500–3000 p.s.i., forces the fluid through a check valve 56 and filter 58 to an accumulator 60 which stores hydraulic pressure and eliminates surging. Pressure line 62 connects with input port 64 of valve 38. The circuit is completed by the valve through the cylinder 22, exhaust flow being through valve port 66 into line 68.

As seen from FIGS. 1 and 2, the valve 38 has a pair of energizable coils 42—44. These coils may be connected in series, parallel or in "push-pull," it being necessary only to correctly phase the coils such that the desired operation is obtained with a reversal of polarity across them. In this instance, the coils are connected in parallel. The valve 38 is a two-stage valve and embodies a sensitive first stage and a second stage which is operable in response to operation of the quickly responsive first stage. In other words, there is hydraulic amplification in the valve itself which causes the relatively low differential pressures developed in the first stage to be amplified in the second stage in such manner that much higher pressures are applied to operation of the power feed piston 20.

The first or electrically operated stage of the electrohydraulic servo valve is controlled by the flapper 70. This flapper is pivotally mounted at 72 and its position is governed by permanent magnet 74 and by coils 42, 44, which add or subtract flux in accordance with energization thereof.

Fixed restrictions 75 and 77 in conjunction with nozzles 90 and 92 are proportioned such that a leakage flow of from 10% to 20% of maximum flow is permitted through the first stage of the valve. That is to say, fluid flows through pressure port 64, around land portion 78, through passage 80, filters 82, passages 84 and 88 to nozzles 90, 92. Passages 94, 96, and ports 34 and 36 are open to this flow, but inasmuch as the valve is balanced, no action results.

Let it be assumed that the polarity of terminals 98–100 (FIG. 1) is such that downfeed of the electrode 10 is called for. In such instance, coils 42, 44, are energized in such polarity that flapper 70 is attracted toward nozzle 92 and away from nozzle 90. As flapper 70 moves toward nozzle 92, increased pressure is developed in passage 96, and pressure is decreased in passage 94, and valve spool 40 is moved to the right. This exposes port 34 to full pressure of port 64 and port 36 is opened to exhaust port 66 by movement of land 102 to uncover passage 104. Thus pressure is increased at port 34 and decreased at port 36, and power feed piston 20 will be moved downwardly by fluid displacement.

When electrode retraction or backup is signalled, coils 42, 44, are oppositely polarized and opposite movement of flapper 70 causes pressure on port 36 and exhaust on port 34.

The advantage of the two-stage valve in operation of the power feed is believed clear from the above when it is considered that redistribution of fluid pressues from the first valve stage may result in only one or two pounds per square inch net differential on spool 40. Cylinder 22 may be operated at 1000 p.s.i. or more and have a ram area of 10 square inches or more to generate up to 50,000 pounds of force. To operate spool 40 directly with sufficient sensitivity would be extremely difficult, while operation of flapper 70 with the relatively small electrical forces available is entirely practical. Thus an extremely sensitive, quick acting and high power feed mechanism results.

The terminals 98–100, constitute the output terminals of a sensing circuit which senses the position of the electrode 10 with respect to the work 12, and signals the servo system when downfeed is necessary to maintain optimum gap distance, when gap impedance changes due to a full or partial short circuit condition, etc. The sensing circuit forms no part of the present invention and will not be described in the interest of brevity. Reference is made to my copending application Serial No. 805,607, filed April 10, 1959, now Patent No. 2,996,638, and Serial No. 836,788, filed August 28, 1959, for examples of sensing circuits suitable for use with the present servo system.

In a typical EDM operation, the electrode may downfeed at a rate of 20 inches per minute. As the electrode approaches the workpiece and establishes a gap of approximately .003 inch, machining begins, and the servo must establish a null condition and thereafter feed at a very slow rate. If there is blacklash in the system to any considerable degree, the electrode will overrun and the sensing circuit will instantly signal backup. Upon backup, the backlash causes overrun in the opposite direction and a continuous hunting action is set up which is detrimental to the stable operation of the device.

Hydraulic valves of the type just described, of which the valve 38 is a specific example, have two troublesome characteristics, hysteresis and "null threshold resistance." "Null threshold resistance" is defined as the magnitude of force, in this instance represented by electrical signal required to cause a reversal of output flow in the valve. Similarly "threshold resistance" is defined as the change of force at any flow through the valve required to cause a change of flow in the output. In precision valves, this force is in the order of one or two percent. Hysteresis may be defined as the overlap or null shift with respect to full signal and is best illustrated by reference to FIG. 5 which is a graphic representation of typical fluid displacement conditions. In FIG. 5, the magnitude of electrical signal necessary on coils 42, 44, to cause displacement of the spool 40 is indicated on the abscissa, and the corresponding fluid displacements is shown on the ordinate.

Let it be assumed that an electrical signal of magnitude 106 equivalent to 100 percent signal in one direction is impressed on the valve coils, and that fluid displacement of magnitude indicated at 108 occurs. In this particular valve, a reverse or negative signal equivalent to 110 has to be applied to bring the spool to a zero or null condition to thus zero the feed of the piston 20 from a previous condition of full feed. Correspondingly, a reverse signal of magnitude 112 is necessary to zero the movement of the piston from a previous feed rate initiated by a signal 114.

The null hysteresis of the valve then may be rated as the quantity 116 which may be expressed as a percentage of full signal. In other words, the valve hysteresis equals quantity 116 divided by quantity 106 or quantity 114, and in a typical precision valve this percentage will fall between two and five percent.

Hysteresis is caused by friction between the operating parts of the valve and by overlap or underlap of the lands of the valve spool with respect to the ports and is inherent in valve construction.

In applications such as that described herein, threshold sensitivity and hysteresis combined frequently and perhaps generally require more control force than that required for operation of the valve to control the servo system. This means that a hydraulic servo system operating with perfectly sealed components would operate practically continuously in the least reliable position of the control valve. Control of feed rate could be effected only by pulsing or surging the valve outside of its sensitivity-hysteresis band to insure displacement of the spool and immediately reducing this signal to prevent or limit overtravel.

In terms of speed measurement, a sensitivity characteristic of two percent in a thirty inch per minute system corresponds to .60 inch per minute of feed as the absolute minimum feed rate. In typical electrical-discharge and electrolytic machining, this exceeds the feed rate of the electrode during actual machining. Hence, machining with such apparatus would require electrode advance in steps limited and controlled by the threshold-hysteresis sensitivity of the valve. Such is undesirable.

Accordingly I have devised a hydraulic servo system that is free from the above mentioned objections. Referring now to FIG. 1, it may be seen that piston 20 is provided with a tapped hole 118 in which is disposed a threaded plug 120 provided with a bleed hole 122. The bleed hole 122 (which may be drilled directly in the piston if desired) is of sufficient size to leak fluid through the piston at such rate that the pressure required to be maintained on the bottom of the piston to maintain the piston in a selected stationary position is of magnitude sufficient to require that the valve spool 40 be biased off of its center or null position. Thus, for a condition of slow downfeed or slow backup of the electrode 10, such as is the case during normal machining, the null position of the valve is never encountered. The only time that the land 78 crosses the zero position is when the sensing control calls for a reversal from full downfeed to full backup or vice versa, such as occurs during conditions of open circuit or short circuit. During these conditions, precise control of electrode movement is of less importance.

The bleed hole 122 performs another important function: it permits air or gas entraped in the system to bleed through the piston and be forced into reservoir 46 where it escapes to the atmosphere. Thus, solid operation of the system without backlash is achieved.

FIGS. 3 and 4 show a modification to be used when horizontal cylinders are used. In a horizontal cylinder, fluid ports 26, 28, should be located in the highest portions of the respective cylinder ends or wall and the bleed passage consists of a groove 122' in the topmost inner surface of the cylinder 22'.

Hydraulic cylinders of proper design have about one-half of one percent leakage when new. As lapping occurs in use, this percentage is frequently reduced. Experience with the system above described indicates that a minimum leakage of two percent is required, best operating characteristics being obtained with a leakage factor of from five to ten percent. A system now in use with an outstanding performance record has a fluid displacement of .8 gallon per minute with a bleed rate of between .04 and .08 gallon per minute.

Fundamentally, in the operation of the servo system under consideration, there should be always a biasing force on the piston sufficient to require development of counteracting pressure of enough magnitude to keep the valve off center the required amount. In the case of vertical cylinders with relatively heavy electrodes, the weight of the electrode, holder, piston, rod, etc., is sufficient. In the case of very lightweight electrodes used with small cylinders, it may be necessary to employ a biasing means such as a spring, weight or the like, to overcome the reaction force of coolant being pumped into the electrode cavity. Such is true also in installations using horizontal cylinders where the effect of gravity is nonexistent.

It will thus be seen that I have provided an improved hydraulic servo system of extreme sensitivity, which operates without backlash. While I have shown preferred embodiments for illustrative purposes, it will be understood that the principles disclosed herein are applicable to other mechanisms, and I do not intend to limit the invention except as set forth in the appended claims.

I claim:

1. In a hydraulic servo system having a source of pressure fluid, a reversible hydraulic motor and a valve operable to selectively control fluid flow to said motor for causing operation thereof in both directions, said valve having inherent null threshold resistance to change of state of fluid flow, a force biasing movement of said motor in one direction, means in said motor permitting flow of fluid through said motor at sufficient pressure to counteract said bias, said fluid flow being at least equal to that required to overcome the null threshold resistance of said valve.

2. The combination of claim 1 wherein said motor comprises a cylinder and piston and said means permitting fluid flow comprises means for leaking fluid past said piston.

3. The combination of claim 1 wherein said motor comprises a cylinder and piston and said means permitting fluid flow comprises a bleed hole in said piston.

4. The combination of claim 1 wherein said motor comprises a cylinder and piston and said means permitting fluid flow comprises a groove in the cylinder wall for leaking fluid past said piston.

5. In an electrical discharge machining apparatus having an electrode adapted to be fed toward a workpiece in constant selected gap relationship therewith, a servo-feed system for controlling the position of the electrode comprising a hydraulic cylinder, a piston reciprocable in said cylinder, a piston rod supporting said electrode, a source of fluid pressure and a valve for controlling flow of pressure fluid to said cylinder, said valve having inherent threshold-hysteresis resistance to change of state of fluid flow, a force biasing movement of said piston in one direction, a bleed passage in said cylinder permitting leakage of fluid past said piston, said passage being of such size that sufficient flow is maintained past said piston to counteract the bias force and maintenance of said pressure requires displacement of said valve beyond the range of null threshold when said piston is stationary.

6. The combination of claim 5 wherein the leakage past said piston is between 5 and 10 percent of fluid flow.

7. In a hydraulic servo system having a source of pressure fluid, a reversible hydraulic motor and a valve operable to selectively control fluid flow to said motor for causing operation thereof in both directions, said valve having inherent hysteresis resistance to change of state of fluid flow, a force biasing movement of said motor in one direction, means in said motor permitting flow of fluid through said motor at sufficient pressure to counteract said bias, said fluid flow being at least equal to that required to overcome the hysteresis resistance of said valve.

8. The combination of claim 7 wherein said motor comprises a cylinder and piston and said means permitting fluid flow comprises means for leaking fluid past said piston.

9. The combination of claim 7 wherein said motor comprises a cylinder and piston and said means permitting fluid flow comprises a bleed hole in said piston.

10. The combination of claim 7 wherein said motor comprises a cylinder and piston and said means permitting fluid flow comprises a groove in the cylinder wall for leaking fluid past said piston.

11. In an anti-hunting hydraulic servo system, a source of pressure fluid, a vertically disposed cylinder, a piston reciprocable in said cylinder and a valve for controlling movement of said piston, said valve having operative positions corresponding to downfeed, backup and null positions of said piston, means permitting flow of fluid past said piston such that said valve must be in backup position in order to counteract the force of gravity on said piston and hold the latter in null position.

12. In combination in a machine tool having a reversible guided servo driven member, a hydraulic servo system for driving said member including a reversible hydraulic motor, a servo-valve for controlling operation of said motor, force means biasing said motor in one direction of movement, means in said motor permitting flow of fluid through said motor for counteracting said bias, the flow required to maintain said motor stationary being at least equal to that required to bias said servo-valve beyond its inherent null threshold range.

13. The combination of claim 12 wherein the hydraulic motor comprises a vertically disposed cylinder and piston and the weight of the piston and associated mechanism provides the motor bias force.

14. The combination of claim 13 wherein the piston is provided with a bleed passage for permitting fluid flow through said piston.

15. The combination of claim 12 wherein the hydraulic motor comprises a horizontally disposed cylinder and piston and a groove in the top portion of the cylinder wall is provided for permitting fluid flow past the piston.

References Cited in the file of this patent

UNITED STATES PATENTS

| | | |
|---|---|---|
| 513,601 | Teal | Jan. 30, 1894 |
| 2,823,689 | Healy | Feb. 18, 1958 |
| 2,832,365 | Smith | Apr. 29, 1958 |

OTHER REFERENCES

Kauffmann: German application Ser. No. 1,002,202, printed Feb. 7, 1957 (Kl 60—30).